United States Patent Office 3,323,932
Patented June 6, 1967

---

3,323,932
ANTIOXIDANT CARBON BLACK
Peter Aboytes, Borger, Tex., and Joseph Iannicelli, Macon, Ga., assignors to J. M. Huber Corporation, Borger, Tex., a corporation of New Jersey
No Drawing. Filed Jan. 24, 1964, Ser. No. 339,883
6 Claims. (Cl. 106—307)

This application is a continuation-in-part of copending U.S. application S.N. 205,074 filed July 25, 1962.

This invention relates to modified carbon blacks.

More particularly, this invention relates to modified carbon blacks which impart resistance to aging to rubber compounds.

Carbon blacks are extensively used for many purposes, varying widely as to their characteristics and combination of characteristics by which they are adapted to different specific uses. The rubber industry, in particular, consumes a large volume of carbon black for use as a reinforcing filler in rubber formulations. There are available to the manufacturer, many carbon blacks of the channel and furnace types with varying characteristics which will impart various properties to the rubber. Among these various properties found in rubber is the resistance to oxidation, or aging. Generally, rubber compounds which have little resistance to aging exhibit cracking or crazing of the surface upon prolonged exposure to air and sunlight. This results in a weakening of the rubber compound and a reduction of its beneficial strength properties, such as, modulus, tensile, elongation, and hardness.

This aging effect is commonly noticeable in tires used on off-the-road equipment, mainly because of the long life of these tires. Manufacturers of these tires and other rubber compounds which are susceptible to deleterious aging have sought to discover economical methods by which aging is minimized or eliminated.

It is therefore an object of this invention to provide modified carbon black which will impart antioxidant properties to rubber compounds.

A further object of this invention is to provide rubber compounds with antioxidant properties.

Other objects and advantages of this invention will become apparent from the following specification.

This invention is based upon the discovery that modified carbon blacks which impart antioxidant properties to rubber compounds can be produced by successively reacting the carbon black with organic polyisocyanates and mercaptoalkylamines.

In this reaction the organic polyisocyanate reacts with the reactive sites of the carbon black surface, leaving at least one isocyanate group unreacted.

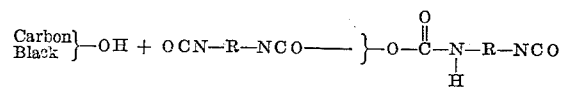

The unreacted isocyanate groups then are reacted with the amine group of the mercaptoalkylamine. This leaves pendant mercapto groups which are in part responsible for the unique properties of the modified carbon blacks.

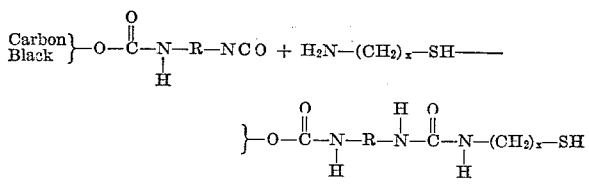

Generally the amount of modifier on the carbon black is limited only by the number of reactive sites. However, as a practical matter, 0.5% organic polyisocyanate-mercaptoalkylamine, on the carbon black, by weight, is the minimum amount effective to impart significant antioxidant properties to rubber compounds. Generally as much as 5.0% modifier by weight can be accepted by the reactive sites of the carbon black, however quantities of modifier less than and in excess of the optimum will result in less than the optimum properties in the rubber. Laboratory experiments have shown that optimum properties are obtained when using 1.4 to 1.6% of modifier on the carbon black.

The carbon blacks used in practicing this invention include super abrasion furnace (SAF), high abrasion furnace (HAF), intermediate super abrasion furnace (ISAF), fast extrusion furnace (FEF), and fine furnace (FF).

The organic polyisocyanates suitable for use in this invention are depicted by the following formula:

wherein R is alkylene, phenylene, lower alkyl substituted phenylene, phenyl substituted lower alkylene, halo substituted phenylene, cycloalkyl substituted alkylene, vinylidene and polymethylene polyphenyl, and $x$ is a number of 2 or more. Representative compounds are hexamethylene diisocyanate, tolylene-2,4-diisocyanate (TDI), tolylene-2,6-diisocyanate, diphenylmethane-4,4′-diisocyanate, 1,3-phenylene diisocyanate, 1,4-phenylene diisocyanate, 4,4′-biphenylene diisocyanate, monochlorophenyl-2,4-diisocyanate, dicyclohexylmethane diisocyanate, 3,3′-dimethyl-4,4′-biphenylene diisocyanate (bitolylene diisocyanate) (TODI), 3,3′-dimethoxy-4,4′-biphenylene diisocyanate (dianisidine diisocyanate) (DADI), and polymethylenepolyphenyl isocyanate (PAPI).

The mercaptoalkylamines useful in this invention are depicted by the following formula:

wherein $x$ is a number from 2 to 8.

The carbon blacks are modified by first reacting the polyisocyanate with carbon black slurried in an organic medium at reflux temperatures under anhydrous conditions. This reaction product is then reacted at reflux temperatures with a mercaptoalkylamine. The resulting product is then filtered and dried. The modified blacks can also be prepared in the vapor phase wherein the carbon black is first reacted with vapors of a polyisocyanate, then the reaction product is reacted with mercaptoalkylamine vapors.

The following examples illustrate the preparation of the modified carbon blacks of this invention. TDI and mercaptoethylamine which are typical of the useful modifiers are used to illustrate the invention. It is not intended, however, that the invention be limited to these specifics.

EXAMPLE 1

To a 5 liter, 3 neck flask containing three liters of anhydrous benzene was added 500 grams of HAF carbon black which had been dried overnight at 105° C. The flask was equipped with a mechanical stirrer and reflux condenser to which was attached a calcium chloride drying tube. To the resulting mixture was added 5.0 grams of TDI (0.0287 moles), 1% based on the weight of the carbon black. The resulting slurry was stirred for 30–45 minutes at reflux after which 0.0287 moles of mercaptoethylamine hydrochloride were added. The slurry was stirred and refluxed for an additional 30–45 minutes. The resulting product was filtered, washed and then dried in vacuum at 80° C. This product contained 1.14% TDI-mercaptoethylamine based on the weight of the carbon black.

EXAMPLE 2

The process of Example 1 was repeated using sufficient TDI and mercaptoethylamine to result in 0.72% modifier on the carbon black.

EXAMPLE 3

The process of Example 1 was repeated, using sufficient TDI and mercaptoethylamine to result in 3.35% modifier on the carbon black.

The modified carbon blacks of this invention were tested in a natural rubber compound and the results are tabulated in the tables to follow in which the following formulation was used:

| | Parts/100 RHC |
|---|---|
| Smoked sheet | 100.0 |
| Carbon black | 45.0 |
| Zinc oxide | 3.0 |
| Stearic acid | 3.0 |
| Pine tar | 3.0 |
| Age rite HP [1] | 1.0 |
| NOBS special [2] | 0.35 |
| Sulfur | 2.75 |
| | 158.10 |

[1] A blend of approximately 65 parts phenyl-B-naphthylamine and approximately 35 parts diphenyl-p-phenylenediamine.
[2] N-oxydiethylene benzothiazole-2-sulfenamide.

TABLE I.—PROPERTIES RETAINED AFTER OXYGEN BOMB AGING 48 HOURS AT 176° F.

| Carbon Black, Percent Modifier | Cure Time, Minutes | 300% Modulus Retention | Percent Tensile Retention | Percent Elongation Retention | Hardness Change in Points |
|---|---|---|---|---|---|
| None | 35 | 67 | 36 | 69 | −2 |
| 3.35 | 35 | 88 | 59 | 88 | 0 |
| 1.14 | 35 | 78 | 60 | 92 | 0 |
| 0.72 | 35 | 75 | 49 | 79 | 0 |
| None | 50 | 67 | 43 | 78 | −1 |
| 3.35 | 50 | 88 | 52 | 88 | 0 |
| 1.14 | 50 | 86 | 62 | 93 | +1 |
| 0.72 | 50 | 78 | 54 | 88 | +2 |
| None | 70 | 68 | 38 | 69 | +1 |
| 3.35 | 70 | 88 | 51 | 88 | +1 |
| 1.14 | 70 | 80 | 56 | 80 | +1 |
| 0.72 | 70 | 74 | 51 | 82 | +1 |

The data in Table I indicates that rubber compounds containing the modified carbon blacks of this invention upon aging, retain significantly greater physical properties than the control with the unmodified black.

TABLE II.—COMPARISON OF MODIFIED BLACK AND CONTROL

| Cure, Min. | Modulus | | | Tensile | Elongation | Hardness |
|---|---|---|---|---|---|---|
| | 200% | 300% | 400% | | | |
| Control—Unmodified Carbon Black | | | | | | |
| 35 | 740 | 1,500 | 2,380 | 4,380 | 605 | 57 |
| 50 | 870 | 1,720 | 2,730 | 4,430 | 565 | 62 |
| 70 | 1,020 | 1,920 | 2,880 | 4,590 | 555 | 65 |
| 140 | 1,040 | 1,980 | 2,960 | 4,450 | 540 | 65 |
| Carbon Black with 1.56% TDI-mercaptoethylamine | | | | | | |
| 35 | 920 | 1,790 | 2,780 | 4,710 | 580 | 62 |
| 50 | 1,160 | 2,140 | 3,120 | 4,950 | 580 | 65 |
| 70 | 1,170 | 2,180 | 3,230 | 4,630 | 530 | 67 |
| 140 | 1,220 | 2,210 | 3,220 | 4,470 | 510 | 67 |

The data in Table II indicate that the modified carbon blacks impart generally superior properties to rubber compounds.

The new modified carbon blacks have the added advantage of better dispersibility in rubber with a resulting reduction in heat generation on the mill.

The foregoing is illustrative only and additional modifications may be made without departing from the substance of the invention as defined in the appended claims.

We claim:

1. A modified carbon black for imparting antioxidant properties to natural rubber and synthetic rubber compounds having 0.5% to 5% by weight modifier, the modifier comprising an organic polyisocyanate reacted with the carbon black and having the formula $$R(NCO)_x$$

wherein R is alkylene, phenylene, lower alkyl substituted phenylene, phenyl substituted lower alkylene, halo substituted phenylene, cycloalkyl substituted alkylene, vinylidene or polymethylene polyphenal, and $x$ is a number of 2 or more, and a mercaptoalkylamine reacted with the organic polyisocyanate and having the formula $$H_2N-(CH_2)_y-SH$$

wherein $y$ is a number from 2 to 8.

2. A modified carbon black according to claim 1 wherein the amount of modifier is from 1.4% to 1.6% based on the weight of the carbon black.

3. A modified carbon black according to claim 1 wherein the organic polyisocyanate is tolyene-2,4-diisocyanate and the mercaptoalkylamine is mercaptoethylamine.

4. A modified carbon black according to claim 2 wherein the organic polyisocyanate is tolyene-2,4-diisocyanate and the mercaptoalkylamine is mercaptoethylamine.

5. A process for the production of modified carbon black which comprises reacting with the carbon black an organic polyisocyanate having the formula $$R(NCO)_x$$

wherein R is alkylene, phenylene, lower alkyl substituted phenylene, phenyl substituted lower alkylene, halo substituted phenylene, cycloalkyl substituted alkylene, vinylidene or polymethylene polyphenyl and $x$ is a number of 2 or more, and then reacting with the organic polyisocyanate a mercaptoalkylamine having the formula $$H_2N-(CH_2)_y-SH$$

wherein $y$ is a number of from 2 to 8 with the carbon black having 0.5% to 5% modifier thereon.

6. A process as claimed in claim 5 wherein the organic polyisocyanate is tolyene-2,4-diisocyanate and the mercaptoalkylamine is mercaptoethylamine.

References Cited

UNITED STATES PATENTS

| | | |
|---|---|---|
| 2,729,618 | 1/1956 | Muller et al. |
| 2,780,612 | 2/1957 | Grotenhuis. |
| 3,025,259 | 3/1962 | Watson et al. |
| 3,156,576 | 11/1964 | Grotenhuis. |
| 3,247,003 | 4/1966 | Pollack _____ 106—307 |

MORRIS LIEBMAN, *Primary Examiner.*

R. BARON, *Assistant Examiner.*